United States Patent

[11] 3,616,218

| [72] | Inventors | Isamu Shiio<br>Tokyo;<br>Konosuke Sano, Shigeru Nakamori;<br>Ryuichi Miyajima; Noboru Katsuya,<br>Kawasaki, all of Japan |
|---|---|---|
| [21] | Appl. No. | 34,637 |
| [22] | Filed | May 4, 1970 |
| [45] | Patented | Oct. 26, 1971 |
| [73] | Assignee | Ajinomoto Co., Inc.<br>Tokyo, Japan |
| [32] | Priorities | Aug. 4, 1966 |
| [33] | | Japan |
| [31] | | 41/51266;<br>Aug. 31, 1966, Japan, No. 41/57005<br>Continuation-in-part of application Ser. No. 699,807, Jan. 23, 1968, now abandoned,<br>Continuation of application Ser. No. 658,251, Aug. 3, 1967, now abandoned. |

[54] METHOD OF PRODUCING L-LYSINE
7 Claims, No Drawings

[52] U.S. Cl. .................................................. 195/29
[51] Int. Cl. .................................................. C12b 1/00
[50] Field of Search ...................................... 195/29, 30, 47

[56] References Cited
OTHER REFERENCES

Kutseva et al., Biosynthesis of Lysine Chemical Abstracts Vol. 66 No. 73486K, 1967
Shiio et al., Chemical Abstracts Vol. 70 No. 86276Z 1969

*Primary Examiner*—A. Louis Monacell
*Assistant Examiner*—Gary M. Nath
*Attorney*—Kelman and Berman ABSTRACT: When strains of Brevibacterium flavum, whose growth in a culture medium is inhibited by addition of excess threonine or methionine, but which may require threonine for their growth, are cultured on an otherwise conventional medium including a proper amount of threonine, a large amount of L-lysine accumulates in the medium.

METHOD OF PRODUCING L-LYSINE

This application is a continuation-in-part of our copending application Ser. No. 699,807, filed on Jan. 23, 1968, now abandoned, and itself a continuation of our copending application Ser. No. 658,251, filed Aug. 3, 1967, and now abandoned.

This invention relates to the fermentative production of amino acids, and particularly to the preparation of L-lysine.

L-lysine is one of the amino acids essential for human and animal nutrition, and is being used for the enrichment of food and animal feed.

We have found that all mutant strains of Brevibacterium flavum whose growth is inhibited by the presence of threonine or methionine in their culture medium in amounts of as little as 10 mg./ml., but which may require smaller amounts of threonine for their growth, produce and accumulate L-lysine in economically useful amounts when cultured aerobically on an otherwise conventional culture medium which contains less than the inhibiting amount of threonine. None of the microorganisms of this invention require amino acids other than threonine for their growth, and some do not need threonine nor methionine.

The lysine-producing strains are readily obtained in a conventional manner by exposing vegetative cells of a parent strain to such mutagenic agents as ultraviolet light, X-rays, or gamma rays, and by screening the irradiated material for its sensitivity to threonine (or methionine). Suitable mutant strains have also been obtained by contacting the parent strain with sodium nitrite solution, ethyl methane sulfate, or N-methyl-N'-nitro-N-nitrosoguanidine in a well-known manner. Threonine- or methionine-sensitive strains are also found in nature.

The threonine-sensitive micro-organisms listed in table I have been employed successfully in the method of our invention. "NG" in the table is N-methyl-N'-nitro-N-nitrosoguanidine.

TABLE 1

| Mutant Strain | Threonine requirement | Mutagen |
|---|---|---|
| Brev. flavum S-13 | − | NG and U.V. light |
| Brev. flavum S-20 | − | NG and U.V. light |
| Brev. flavum S-5 (ATCC No. 21127) | − | NG and X-rays |
| Brev. flavum ST-4 | + | NG and U.V. light |
| Brev. flavum ST-12 (ATCC No. 21128) | + | NG and U.V. light |
| Brev. flavum ST-17 (ATCC No. 21129) | + | NG and U.V. light |

Table 2 shows the typical inhibiting effect of threonine on the growth of Brevibacterium flavum S-13, a lysine-producing strain, as compared to the effect on its parent strain. Brevibacterium flavum (ATCC No. 14,067). When the strain S-13 was cultured for a long time in a medium containing very small amounts of threonine, only little growth was observed, much less than of the parent strain.

TABLE 2

| Micro-organism | Cultured for (hrs.) | L-threonine (mg/ml) | | | | | | | | | |
|---|---|---|---|---|---|---|---|---|---|---|---|
| | | 0 | 0.01 | 0.05 | 0.1 | 0.5 | 1.0 | 5.0 | 10.0 | 50.0 | 100.0 |
| Br. flavum S-13 | 18 | + | + | − | − | − | − | − | − | − | − |
| | 37 | + | + | + | + | − | − | − | − | − | − |
| | 157 | + | + | + | + | + | + | − | − | − | − |
| Br. flavum No. 2247 | 18 | + | + | + | + | + | + | + | + | + | + |
| | 37 | + | + | + | + | + | + | + | + | + | + |
| | 157 | + | + | + | + | + | + | + | + | + | + |

Both strains were cultured at 30° C. with shaking in a medium held in glass tubes. The culture medium had the following composition:

| glucose | 5 g./l. |
|---|---|
| urea | 1.5 g./l. |
| $(NH_4)_2SO_4$ | 1.5 g./l. |
| $K_2HPO_4$ | 3.0 g./l. |
| $KH_2PO_4$ | 1.0 g./l. |
| $MgSO_4$ | 0.1 g./l. |
| $CaCl_2$ | 0.001 g./l. |
| biotin | 30 μg./l. |
| vitamin $B_1$ | 100 g./l. |

It additionally contained the indicated amounts of threonine and 1 ml./l. of the following solution:

| $Na_4B_4O_7 \cdot 10H_2O$ | 88 mg./l. |
|---|---|
| $(NH_4)_6Mo_7O_{24} \cdot 4H_2O$ | 37 mg./l. |
| $FeCl_3 \cdot H_2O$ | 970 mg./l. |
| $ZnSO_4 \cdot H_2O$ | 8800 mg./l. |
| $CuSO_4 \cdot H_2O$ | 270 mg./l. |
| $MnCl_2 \cdot H_2O$ | 72 mg./l. |

Table 3 shows the growth of Brevibacterium flavum ST-4, which requires threonine and is sensitive to threonine and that of Brevibacterium flavum T-19, a threonine-requiring mutant of Brevibacterium flavum No. 2247 (ATCC 14067) in the above medium when additionally containing L-threonine as listed in table 3.

TABLE 3

| L-threonine (mg/ml.) | ST-4 | growth T-19 |
|---|---|---|
| 0 | 13 | 10 |
| 0.01 | 61 | 65 |
| 0.1 | 235 | 278 |
| 1 | 24 | 187 |
| 10 | 15 | 213 |

The growth was measured by photoelectric colorimeter when the culture had reached its stationary phase at optimal threonine concentration (0.1 mg./ml.) The growth of ST-4 was measured after 24 hours cultivation, and that of T-19 was measured after 20 hours.

Although both strains ST-4 and T-19 require threonine for their growth, the growth of strain ST-4 is greatly inhibited when threonine is present in the culture medium in an amount of more than 1 mg./ml.

Except for the presence of threonine, where required, the culture medium employed in our invention may be entirely conventional. It must contain an assimilable carbon source, an assimilable nitrogen source, and the usual minor nutrients. Suitable carbon sources include carbohydrates, such as glucose, fructose, maltose, sucrose, xylose, starch hydrolyzate, molasses, and organic acids. The concentration of the carbon source in the medium should preferably be 5–16 percent glucose equivalent.

The nitrogen source is employed as a nutrient for the propagation of the micro-organisms and as a source of amino groups for L-lysine. Nitrogen may be provided by ammonium salts of inorganic or organic acids such as $NH_4Cl$, $(NH_4)_2SO_4$, $(NH_4)_2CO_3$, and by ammonia in aqueous solution or in the gaseous state, which may be used simultaneously for pH control in a known manner.

Supplemental inorganic nutrients required include the essential inorganic ions available from potassium phosphate, magnesium sulfate, manganese sulfate, zinc sulfate, ferrous sulfate, sodium chloride and carbonate. Organic growth promoting agents which improve the yield and the rate of production of L-lysine include vitamins and fatty acids, and may be added to the culture medium in the form of substances which yield the active agent under the conditions of fermentation, such as peptone, yeast extract, corn steep liquor, soybean protein hydrolyzate, and various other extracts of vegetal and animal tissues, well-known in themselves.

The threonine-sensitive, threonine-requiring micro-organisms of the invention, such as strain ST-4, produce L-lysine most readily in a culture medium containing threonine in a concentration of 0.01 mg./ml. to 1 mg./ml.

For a good yield of L-lysine, the fermentation should be carried out with aeration and agitation in order to supply sufficient oxygen to the broth. Best yields of L-lysine cannot be obtained unless the pH value in the culture medium is controlled between 5 and 9. Aqueous ammonia, gaseous ammonia, caustic alkali, calcium carbonate, hydrochloric acid, sulfuric acid, nitric acid and other bases and acids may be added to the nutrient medium as required to maintain the desired pH range. For best results, the temperature of the broth should be held between 25° and 35° C. during fermentation. The fermentation is normally carried out for 1 to 5 days.

The recovery of L-lysine from the nutrient medium may follow known methods. The bacterial cells may be removed by filtration or by centrifuging, and L-lysine may be recovered by ion exchange resins, and crystallized from an eluate by vacuum evaporation or precipitation.

The following examples are further illustrative of the invention, but it will be appreciated that the invention is not limited thereto.

EXAMPLE 1

An aqueous culture medium of the following composition was prepared:

| | |
|---|---|
| glucose | 10% |
| $(NH_4)_2SO_4$ | 4% |
| $KH_2PO_4$ | 0.1% |
| $MgSO_4$ | 0.04% |
| biotin | 300 μg./l. |
| Vitamin $B_1$ | 200 μg./l. |
| $Fe^{++}$ | 2 p.p.m. |
| $Mn^{++}$ | 2 p.p.m. |
| $CaCO_3$ | 5% |
| pH 7.5 | |

Twenty-milliliter batches of the solution were placed in 500 ml. shaking flasks, and were sterilized by steam in the flasks at 110° C. for 5 minutes. They were then inoculated with the threonine-sensitive Brevibacterium flavum S-20, which had previously been cultured on bouillon slants for 48 hours at 30° C. The fermentation was carried out at 30° C. under shaking for 5 days. The concentration of the L-lysine (as hydrochloride) produced in the medium, the growth of the micro-organisms, and the pH value of the medium were measured at intervals of 24 hours. The test results are shown in table 4. The growth values were determined in a photoelectric colorimeter.

TABLE 4

| | cultured for (hrs.) | | | | | |
|---|---|---|---|---|---|---|
| | 0 | 24 | 48 | 72 | 96 | 120 |
| L-lysine·HCl (g./dl.) | 0.15 | 1.09 | 1.86 | 1.93 | 1.97 | 2.04 |
| Growth | 1.1 | 115 | 162 | 150 | 151 | 138 |
| pH of the broth | 7.8 | 7.2 | 8.2 | 8.4 | 8.4 | 8.3 |

The microbial cells and calcium salts were removed from one liter of the broth by filtration, and the solution was adjusted to pH 2 with concentrated hydrochloric acid. The acidified solution was passed over a column packed with a strong cation exchange resin of the ammonium type (Duolite C-20). The column was washed with water, and L-lysine was then eluted with 2N ammonium hydroxide solution. The eluate was concentrated to about 200 ml., adjusted to pH 5.6, and further concentrated to 100 ml. 14 g. Crystals of crude L-lysine chloride were precipitated from the solution by cooling.

EXAMPLE 2

A fermentation process was carried out under conditions of example 1, but using the threonine sensitive Brevibacterium flavum S-13. Table 5 shows the results of tests performed as in example 1.

TABLE 5

| | cultured for (hrs.) | | | | | |
|---|---|---|---|---|---|---|
| | 0 | 24 | 48 | 72 | 96 | 120 |
| L-lysine·HCl (g./dl.) | 0.018 | 1.00 | 2.06 | 1.89 | 1.89 | 1.71 |
| Growth | 0.8 | 102 | 175 | 145 | 130 | 140 |
| pH of the broth | 7.8 | 7.2 | 8.1 | 8.4 | 8.5 | 8.4 |

A fermentation carried out under the conditions of example 1 with the threonine-sensitive Brevibacterium flavum S-5 yielded 1.91 g./dl. of L-lysine. HCl in the broth after 5 days cultivation.

Similarly, the threonine-sensitive Brevibacterium lactofermentum S-53 produced 0.91 g./dl. L-lysine. HCl in the broth after 5 days cultivation.

EXAMPLE 3

An aqueous culture medium of the same composition as in example 1 was prepared and mixed with the amounts of L-threonine listed in table 6, 3 milliliter batches of the mediums were placed in 30 ml. test tubes, and were sterilized by steam at 110° C. for 5 minutes. They were then inoculated with the threonine-sensitive, threonine-requiring Brevibacterium flavum ST-5 which had previously been cultured on bouillon slants for 48 hours at 30° C. The fermentation was carried out at 30° C. under shaking. The amounts of L-lysine. HCl produced in the broth after 5 days cultivation are shown in table 6.

TABLE 6

| L-threonine conc. (mg./ml.) | L-lysine·HCl (g./dl.) |
|---|---|
| 0 | 0.04 |
| 0.1 | 2.57 |
| 0.2 | 2.92 |
| 0.3 | 3.07 |
| 0.4 | 3.47 |
| 0.5 | 3.33 |
| 0.7 | 3.04 |
| 1.0 | 2.49 |
| 1.5 | 1.97 |

EXAMPLE 4

An aqueous culture medium of the same composition as in example 1, but containing 0.4 mg./ml. L-threonine was prepared. Twenty milliliter batches of the solution were placed in 500 ml. shaking flasks, and were sterilized by steam in the flasks at 110° C. for 5 minutes. They were then inoculated with Brevibacterium flavum ST-4, which had previously been cultured on bouillon slants for 48 hours at 30° C. The fermentation was carried out at 30° C. under shaking for 3 days. The concentration of the L-lysine (as hydrochloride) produced in the medium, the growth of the micro-organisms (as measured by spectrophotometer in the broth diluted to 1/100 by 0.1N HCL), and the pH value of the medium was measured at intervals of 24 hours. The test results are shown in table 7.

TABLE 7

|  | cultured for (hrs.) | | | |
|---|---|---|---|---|
|  | 0 | 24 | 48 | 72 |
| L-Lysine·HCl (g./dl.) | 0 | 0.8 | 2.4 | 2.7 |
| Growth (OD 562 mµ) | 0.02 | 0.23 | 0.30 | 0.31 |
| pH of the broth | 8.1 | 7.3 | 7.3 | 7.7 |

Brevibacterium flavum ST-17 was cultured under the same conditions. 2.6 g./dl. L-lysine (as hydrochloride) were found in the broth.

EXAMPLE 5

An aqueous culture medium of the same composition as in example 1, but additionally containing 0.6 mg./ml. L-threonine, 0.2 mg./ml. L-methionine and 0.2 ml./dl. soybean protein hydrolyzate was prepared.

It was fermented for 72 hours under the general conditions of example 4 by the micro-organisms listed in table 8 which also lists the amount of L-lysine (as hydrochloride) accumulated in each broth.

TABLE 8

| Micro-organism employed | L-lysine·HCl (g./dl.) |
|---|---|
| Brevibacterium flavum ST-4 | 3.4 |
| Brevibacterium flavum ST-5 | 3.2 |
| Brevibacterium flavum ST-12 | 3.2 |
| Brevibacterium flavum ST-17 | 3.1 |
| Brevibacterium flavum ST-23 | 3.6 |
| Brevibacterium flavum ST-28 | 3.3 |
| Brevibacterium flavum S-20 | 2.3 |

What is claimed is:

1. A method of producing L-lysine which comprises culturing a mutant strain of Brevibacterium flavum on an aqueous nutrient medium under aerobic conditions, while holding the pH of said medium between 5 and 9, until a substantial amount of L-lysine is accumulated in said medium, said microorganism being unable of substantial growth on said medium in the presence of threonine or methionine in an amount of 10 mg./ml., and said medium containing not more than 1 mg./ml. of said threonine or methionine.

2. A method as set forth in claim 1, wherein said micro-organism requires threonine for the growth thereof, and said medium contains 0.01 to 1 mg./ml. of said threonine.

3. A method as set forth in claim 1, wherein said micro-organism is Brevibacterium flavum S-5 (ATCC No. 21127).

4. A method as set forth in claim 1, wherein said micro-organism is Brevibacterium flavum ST-12 (ATCC No. 21128).

5. A method as set forth in claim 1, wherein said micro-organism is Brevibacterium flavum ST-17 (ATCC No. 21129).

6. A method as set forth in claim 1, wherein said micro-organism is derived, prior to said culturing, from a parent strain of Brevibacterium flavum capable of growing on said medium in the presence of 10 mg./ml. threonine by exposing said parent strain to a mutagenic agent, and by screening the exposed material for sensitivity to threonine or methionine in a culture medium in an amount of at least 1 mg./ml.

7. A method as set forth in claim 1, wherein said micro-organism is capable of substantial growth on a culture medium free from amino acids other than threonine.

* * * * *